A. E. AYER.
ROTARY CUTTER.
APPLICATION FILED MAR. 23, 1908.

949,051. Patented Feb. 15, 1910.

Witnesses.
C. H. Garnett.
J. Murphy

Inventor.
Albert E. Ayer
by Jas. H. Churchill
Atty.

UNITED STATES PATENT OFFICE.

ALBERT E. AYER, OF CHELSEA, MASSACHUSETTS, ASSIGNOR TO RUTH L. VOSE, OF BROOKLINE, MASSACHUSETTS.

ROTARY CUTTER.

949,051. Specification of Letters Patent. Patented Feb. 15, 1910.

Application filed March 23, 1908. Serial No. 422,581.

*To all whom it may concern:*

Be it known that I, ALBERT E. AYER, a citizen of the United States, residing in Chelsea, county of Suffolk, and State of Massachusetts, have invented an Improvement in Rotary Cutters, of which the following description, in connection with the accompanying drawings, is a specification, like characters on the drawings representing like parts.

This invention relates to a rotary cutter especially designed and adapted to be employed in trimming the edges of the soles and heels of boots and shoes.

The invention has for its object to provide a cutter of the class described, in which the cutting blades or knives are integral with the head or body portion, and are arranged with relation to said head or body portion as will be described, so that the front and back faces of the said knives or blades are parallel, and the knives or blades are provided with sharp cutting edges, which are preserved in the grinding of the said knives or blades. The head or body portion is preferably constructed as will be described, so as to permit the same and the blades or knives to be made of steel, which can be tempered without distorting, springing or otherwise rendering the knives or blades untrue. These and other features of this invention will be pointed out in the claims at the end of this specification.

Figure 1:
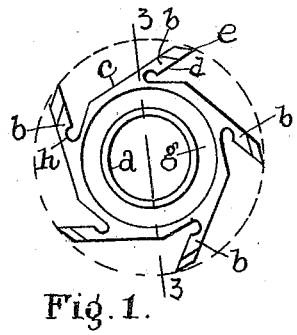
Figure 2:
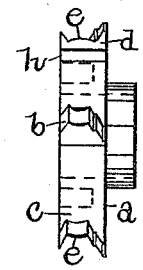
Figure 3:
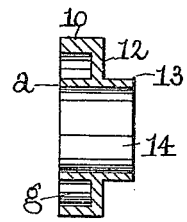
Figure 4:
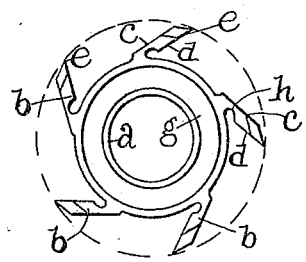
Figure 5:
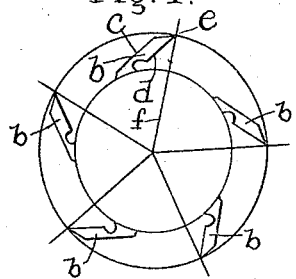

Figure 1 is a side elevation of a rotary cutter embodying this invention. Fig. 2, an end elevation of the cutter shown in Fig. 1, looking toward the left. Fig. 3, a section on the line 3—3, Fig. 1. Fig. 4, a modification to be referred to, and Fig. 5, a diagram to illustrate the invention.

Referring to the drawings $a$ represents the head or body portion of a rotary cutter embodying this invention, and $b$, the blades or knives integral therewith and provided with parallel back and front faces $c$, $d$, and with a cutting edge $e$. In the present instance the knives or blades are shown as provided with a cutting edge shaped for trimming the edges of the soles of boots and shoes, but it will be understood that the said cutting edge may be of any shape according to the particular work to be performed.

In order to provide the integral blades or knives with a cutting edge in contradistinction to a scraping edge, and enable the said blades or knives to be ground when worn or dulled so as to preserve the said edge, the circular body portion or head $a$, is provided with substantially radial projections, from which the blades are extended with their front and back faces at an angle to said projections, so that the back faces $c$ of the same are tangential to the circumference of the head or body portion $a$ or are parallel to a tangent to said circumference and lie in planes which intersect the next rearwardly adjacent blades, while the front faces $d$ of said blades or knives are parallel to the back faces. As a result, the front faces $d$, which form with the end of the blades or knives the cutting edges $e$, are rearwardly inclined with relation to a radial line $f$, drawn from the center of the head to the cutting edge $e$, as clearly represented in Fig. 5, and this inclination of the front face $d$ imparts the desired cutting edge to the blade or knife and by reason of the blades being extended from the substantially radial projections on the periphery or circumference of the body portion $a$, it is possible to incline the blades with relation to said projections the proper or necessary amount to obtain a true cutting edge while at the same time enabling the blades to be ground and preserve the parallel relation of the back and front faces of the blades and thereby the cutting edge.

The blades and the projections from which they extend are made of substantially the width of the body portion or head so as to obtain the desired or necessary strength, and the outer surface or periphery of each blade is backed off or inclined rearwardly from the front to the back face so as to form the cutting edge of the desired or required fineness or sharpness. By reference to Figs. 1, 4 and 5, it will be seen that the junction of the outer surface $d$ with the back face $c$ is not in the same circle as the cutting edge $e$ but is within the circle in which the cutting edge $e$ lies. Near the circumference of the head, the front face is provided with a recess $h$, which forms a clearance space for the material cut by the knife.

In a one-piece rotary cutter provided with a plurality of blades or knives, superior results are obtained if the said cutter is of tempered steel, and one of the objects of the present invention, is to construct the rotary cutter so as to avoid warping, springing, or otherwise rendering the blades untrue and so that their cutting edges are not in the same circle, which is liable to happen when the steel cutter is tempered. This result is accomplished as herein shown by diminishing the amount of metal in the head, which may and preferably will be accomplished by making the annular groove $g$ in one side of the head so as to leave the rim 10, web 12, and hub 13 forming the central bore 14 of substantially the same thickness as the knives or blades, whereby in the tempering process, the heated cutter may cool uniformly and thus avoid the injurious action to the knives above referred to.

In Fig. 1, I have shown one form of knife and in Fig. 4, another, but I do not desire to limit my invention to the particular forms shown.

Claims.

1. A rotary cutter comprising a circular head or body portion having integral with it a plurality of radial projections from which extend at an angle thereto knives or blades having parallel back and front faces and an outer surface which is inclined rearwardly from the front face to said back face, said projections and blades being of substantially the width of the body portion or head and inclined with relation to said projections, with the front face of each blade inclined to a radial line extended to the front cutting edge of said blade, and with the back face of each blade in a plane intersecting the next rearwardly adjacent blade, substantially as described.

2. A rotary cutter comprising a circular head or body portion provided with an annular groove in one side to leave the body portion of substantially the same thickness throughout, and a plurality of knives or blades integral with said head or body portion and extended from projections on the circumference of the same with their back faces substantially parallel to a tangent to said circumference.

3. A rotary cutter comprising a head having a central bore and a recess in its side between said bore and the periphery of said head to form a rim, web and hub of substantially the same thickness, and a plurality of knives or blades integral with said head and extended from substantially radial projections on said periphery with their back faces substantially parallel to tangents to said head, said blades or knives having substantially parallel front and back faces with the front faces inclined rearwardly with relation to radial lines from the center of the said head to the cutting edges of said knives or blades, substantially as described.

4. A rotary cutter comprising a circular head or body portion provided with an annular groove to leave a rim, web, and hub of substantially the same thickness, a projection on the said rim extended radially therefrom, and a blade or knife integral with said projection and said head and inclined to said radial projection with its front face inclined to a radial line extended from the center of the head to the cutting edge of said knife or blade.

In testimony whereof, I have signed my name to this specification in the presence of two subscribing witnesses.

ALBERT E. AYER.

Witnesses:
   JAS. H. CHURCHILL,
   J MURPHY.